F. D. HART.
SCRAPER.
APPLICATION FILED SEPT. 18, 1920.
1,412,940.
Patented Apr. 18, 1922.
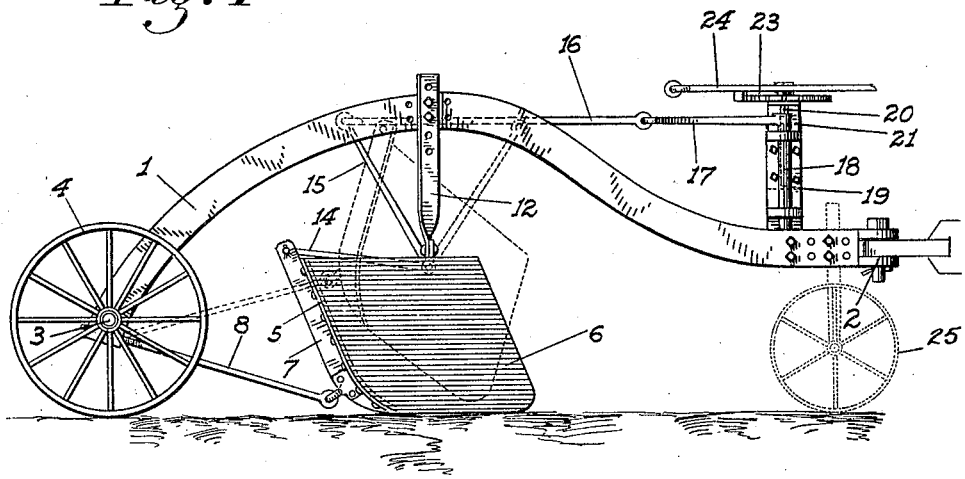
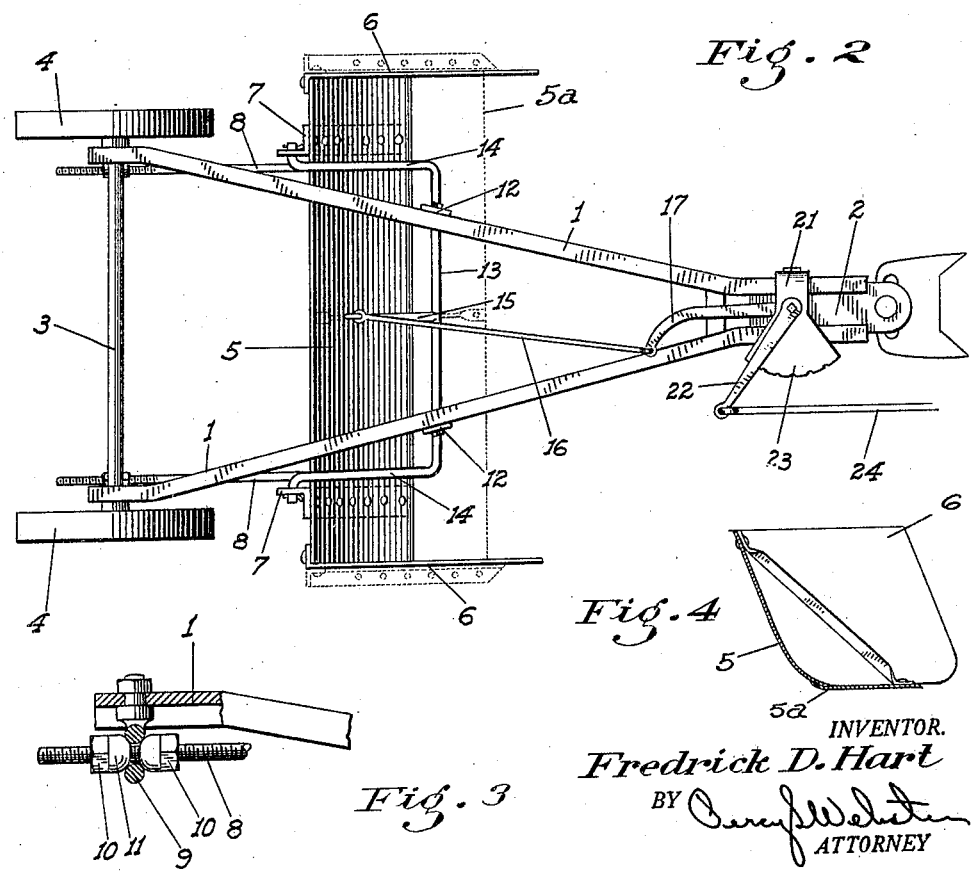
INVENTOR.
Fredrick D. Hart
BY
ATTORNEY

UNITED STATES PATENT OFFICE.

FREDRICK D. HART, OF STOCKTON, CALIFORNIA.

SCRAPER.

1,412,940. Specification of Letters Patent. Patented Apr. 18, 1922.

Application filed September 18, 1920. Serial No. 411,164.

*To all whom it may concern:*

Be it known that I, FREDRICK D. HART, a citizen of the United States, residing at Stockton, county of San Joaquin, State of California, have invented certain new and useful Improvements in Scrapers; and I do declare the following to be a full, clear, and exact description of the same, reference being had to the accompanying drawings, and to the characters of reference marked thereon, which form a part of this application.

This invention relates to improvements in scrapers or levelers, the principal object being to provide a device of this character, which may either be drawn by a tractor or by draft animals, in which, by certain features of construction, I am enabled to raise the scraper much higher than is possible with others now in use, as far as I am aware, and without an excess of movement of the operating handle or lever.

I have also arranged the parts of the device so that not only will the scraper-plate be raised, but it will be tipped forward at the same time, thus insuring that the load will be quickly and readily dumped in a compact heap.

This feature alone makes the device especially valuable for checking building irrigation ditches and the like.

Another object is to provide means for allowing the scraper plate to be set at a transverse angle, both horizontally and vertically, without disturbing the operation of the dumping mechanism.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side elevation of the scraper.
Fig. 2 is a top plan view thereof.
Fig. 3 is a fragmentary sectional plan of a swivel and adjustable brace-connection.
Fig. 4 is a vertical section of the scraper showing an extra blade and brace thereon, such blade and brace being dotted in Fig. 2.

Referring now more particularly to the characters of reference on the drawings, the frame of the device comprises a pair of horizontally positioned beams 1, preferably channel or I beams, arched longitudinally diverging from each from front to rear.

Adjustably fixed between the frames at the forward end is a rigid tongue or drawbar 2 arranged to be connected to a tractor or other form of motive power.

Connecting the frame beams at their rear ends and holding the same in spaced relation is a shaft or axle 3 having ground bearing wheels 4 on the opposite ends thereof outside the frame. Positioned under the frame and ahead of said wheels is a scraper plate 5 having a normal forward slant from top to bottom. Side plates 6 are removably secured to the ends of the scraper blade, the latter projecting beyond the plane of the wheels.

Rigid angle irons 7 are fixed to the back of the member 5 and extend from top to bottom to brace and strengthen the same.

Adjacent the lower ends of these braces, rods 8 are flexibly connected thereto for universal swivel movement, these rods extending rearwardly through eye bolts 9 swivelly-mounted on a horizontal plane to the frames 1 under the axle 3, said rod having adjustment nuts 10 thereon on both sides of the eye bolt, said nuts having semi-spherical washers 11 bearing against said bolts on both sides, so that the rods are held in fixed positions lengthwise and yet may have a certain amount of swivel movement laterally, the swivelly-mounted eye bolts allowing for unlimited vertical movement of the rods.

Independently mounted on the frames 1 for both vertical and longitudinal adjustment relative thereto are standards 12 depending downwardly therefrom and forming fairly loose bearings at their lower ends for a shaft 13, the outer ends of which are bent rearwardly to form arms 14 which are flexibly connected to the brace members 7 of the scraper plate adjacent the upper end thereof.

A lever arm 15 projects upwardly from the shaft 13, preferably central thereof, to the upper end of which a connecting rod 16 extends forward to a similar connection on the outer end of a horizontal arm 17 fixed on a vertical shaft 18 journaled in a bracket 19 on the frame 1.

Slidable in the shaft 18 from above is another shaft 20 journaled in an extension bracket 21 adjustable vertically relative to the bracket 19, said shaft 21 above said bracket having a horizontal operating handle or lever 22 adapted to lock with a quadrant 23 on said bracket in a number of predetermined positions.

The shaft 20 is slidable in the shaft 18 as stated, so that the horizontal level of the handle 22 may be altered by moving the bracket 21 without disturbing the setting of the arm 17. At the same time the shaft 20 is splined or otherwise fitted into the shaft 18 so that the two will turn together when the lever 22 is pulled. If said handle is not within easy reach of the driver of the tractor, a rod 24 may be attached thereto and extend forward any suitable distance.

In operation, the scraper plate or bowl drops to the ground by gravity on releasing the lever 22, but it may be forced into the ground by a backward pressure on said lever. To dump the scraper, the lever 22 is pulled forward, which raises the plate 5 and causes the load to be deposited on the ground. On account of the points of connection of the arms 14 and rods 8 with the scraper plate, when the latter is raised it tilts forward at the top at the same time, as indicated in dotted lines in Fig. 1, so that the dirt will positively be discharged, this angle of tilt being substantially the reverse of the normal angle of setting of the plate. The various parts are also so arranged that a relatively small arc of movement of the lever 22 causes a considerable raising of the scraper plate, the frame being highest above the same. This great amount of raise of the scraper plate is rendered possible and practicable on account of the employment of a horizontal operating handle rather than a vertical lever, the great change of level of the handle end of which from one position of the scraper plate to another making a vertical lever awkward to operate when any considerable movement thereof is had, whereas the horizontal handle always remains in a constant plane.

By adjusting the rods 8 in connection with the standards 12, the angle of setting of the scraper bowl may be altered accordingly, either transversely or vertically, so that it will scrape deeper on one side than on the other, or by removing one of the side plates 6, the dirt scraped up by the forward movement of the device will be discharged to one side in a continuous hill or heap without actually raising the scraper to a dumping position. These positions of the scraper may be had without disturbing or interfering with the dumping mechanism, on account of the various flexible connections.

If horses are used instead of a tractor, a small truck may be provided to support the frame, as shown dotted in Fig. 1 at 25.

Also, an extra blade 5ª can be added to the scraper when the dirt must be removed to a considerable distance; in this case the load is raised just enough to clear the ground and is transferred to the wheels, avoiding useless wear and strain.

From the foregoing description, it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. A scraper comprising a wheel supported frame, a scraper plate positioned between the ends of the frame, flexibly connected rods extending from the frame at the rear of the plate to the latter adjacent the bottom thereof, and substantially horizontal arms connected to the plate adjacent the top thereof and pivoted transversely to the frame ahead of the plate, said arms being arranged to be turned about their pivotal connections to raise the plate.

2. A scraper comprising a wheel supported frame, a scraper plate positioned under the frame, substantially horizontal rods adjustably and flexibly connected to the frame behind the plate and extending thereto, and being flexibly connected adjacent the bottom of the plate, downwardly depending standards positioned ahead of the plate and mounted to the frame for longitudinal and vertical adjustment relative thereto, a transverse shaft turnably mounted in the standards, normally horizontal arms fixed to said shaft and flexibly connected to the plate adjacent the upper end thereof, and means for turning said shaft to raise the plate.

3. A scraper comprising a wheel supported frame, a scraper plate positioned under the frame, flexibly connected rods extending from the frame at the rear of the plate to the latter adjacent the bottom thereof, and horizontal arms connected to the plate adjacent the top thereof, a transverse shaft mounted to the frame ahead of the plate and to which said arms extend, a lever fixed to said shaft and projecting upwardly therefrom, a horizontal lever mounted to the frame ahead of the transverse shaft, and a connecting rod extending between said levers and flexibly connected thereto.

In testimony whereof I affix my signature.

FREDRICK D. HART.